April 1, 1941.   W. H. NUTT   2,237,058
APPARATUS FOR HANDLING AND DECORATING ARTICLES
Filed Feb. 7, 1940   7 Sheets-Sheet 1
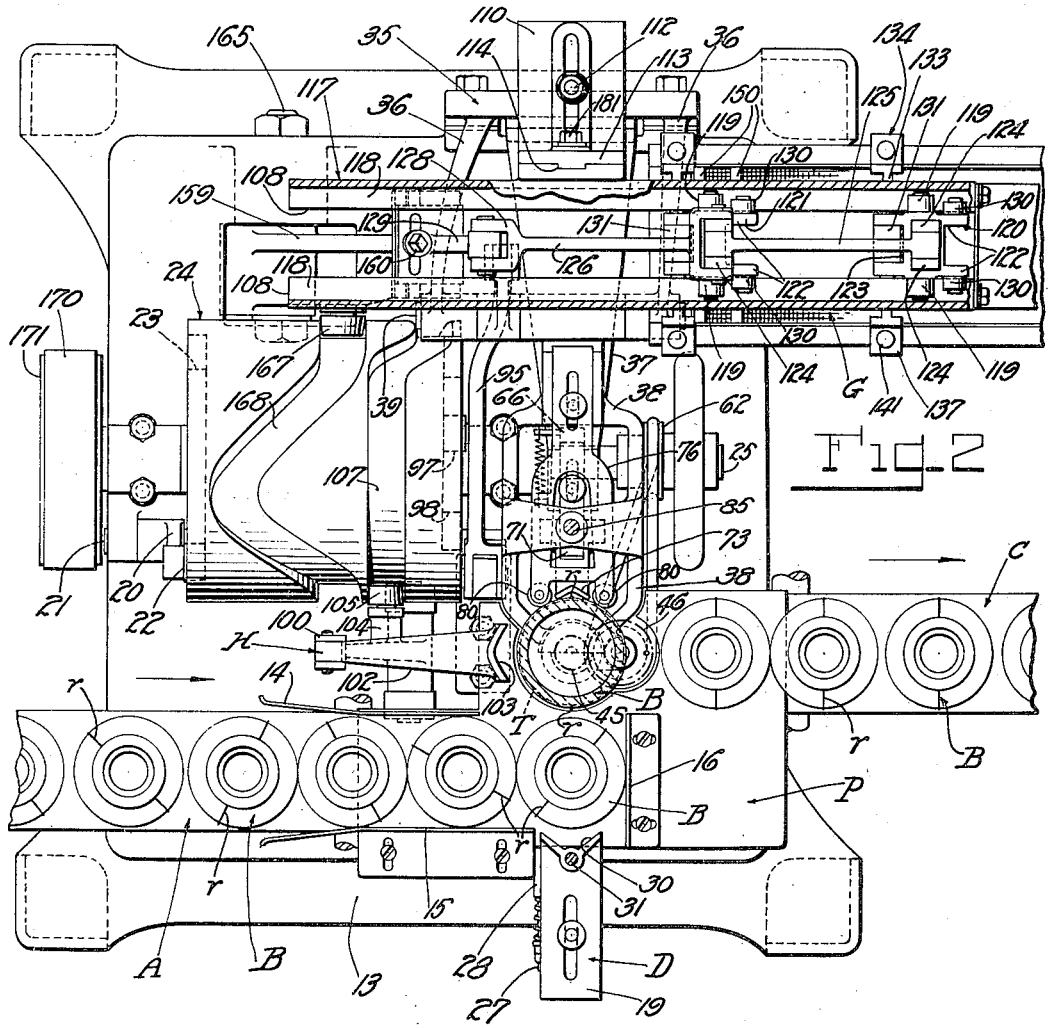
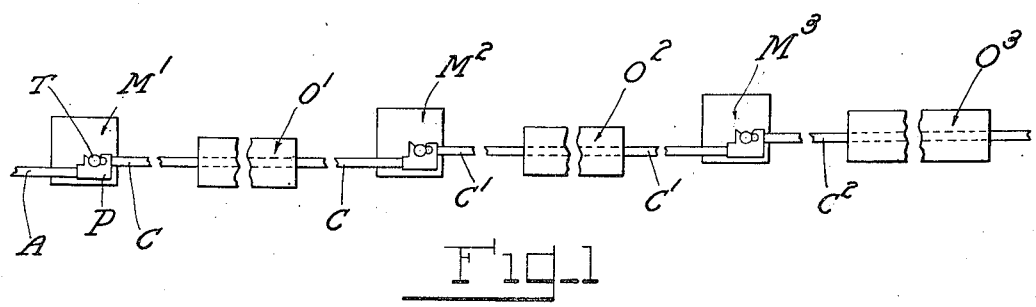

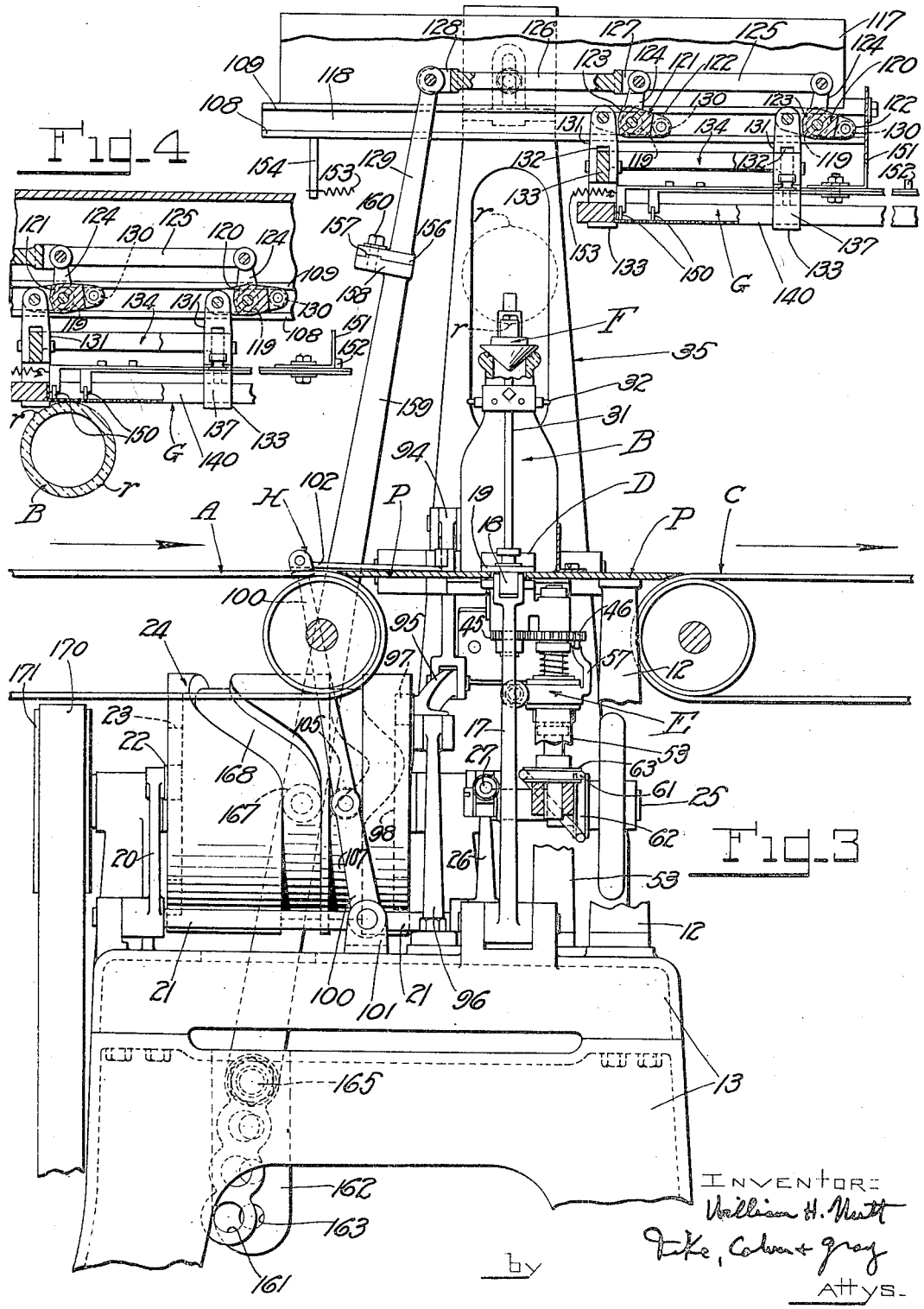

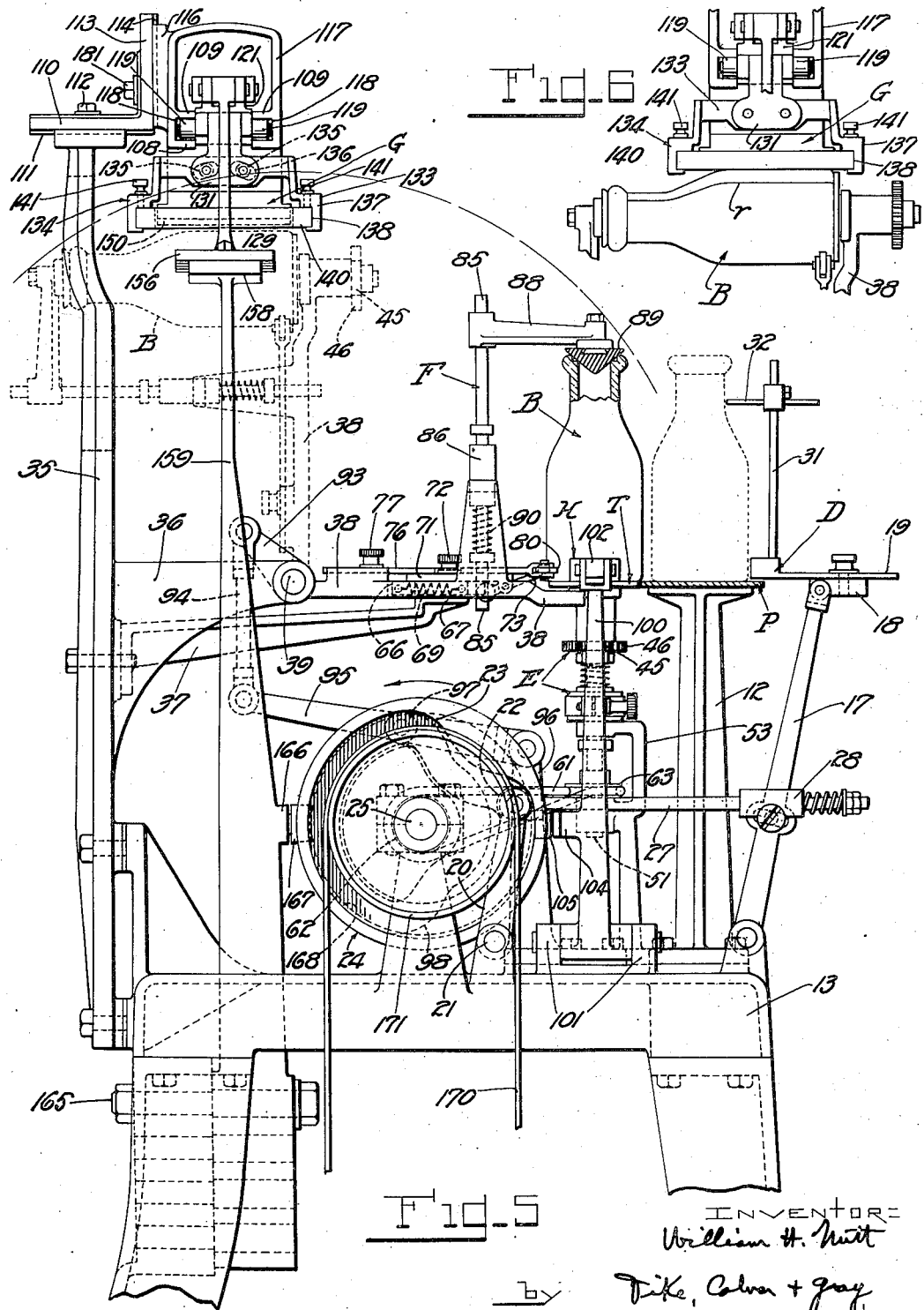

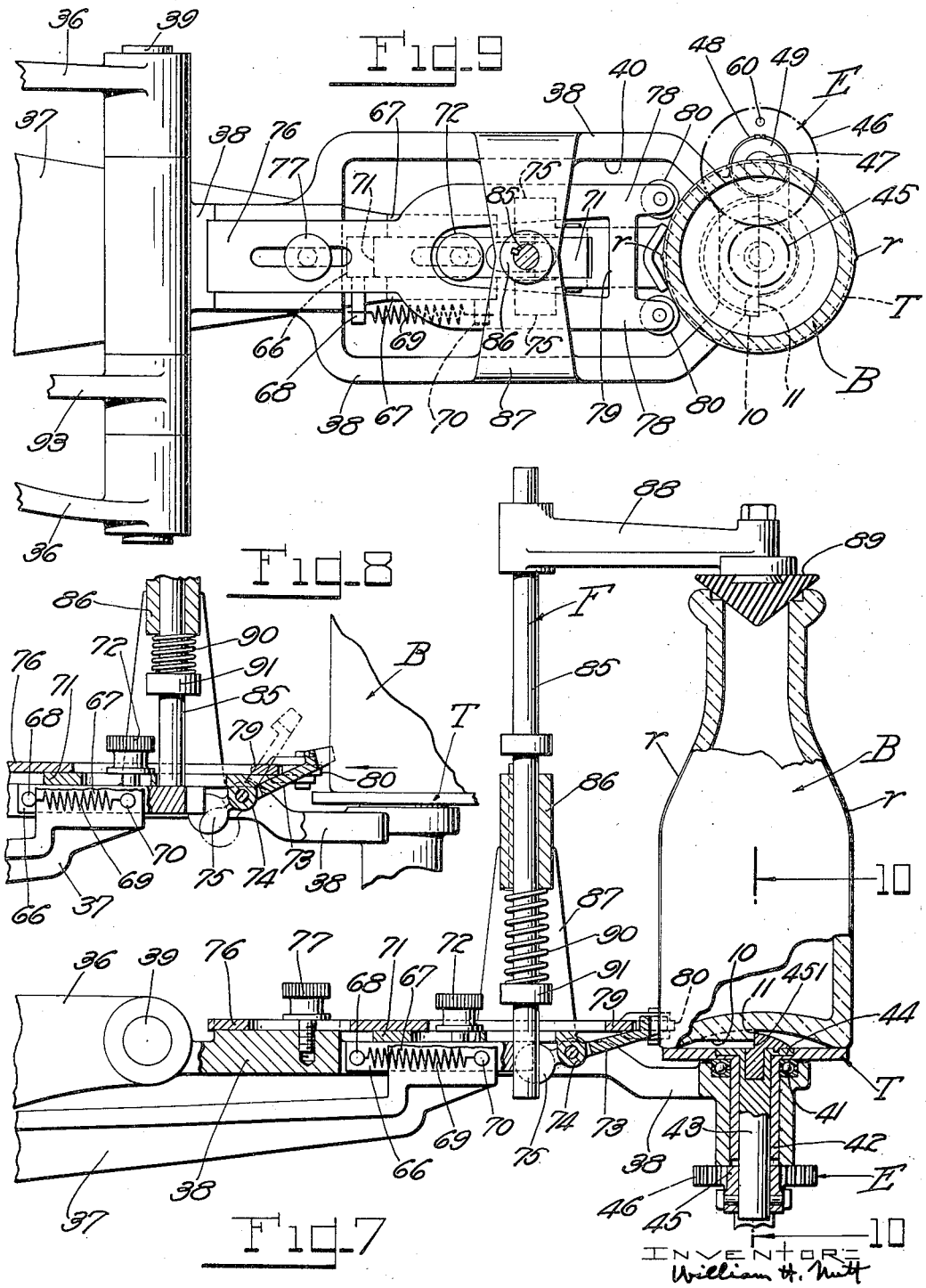

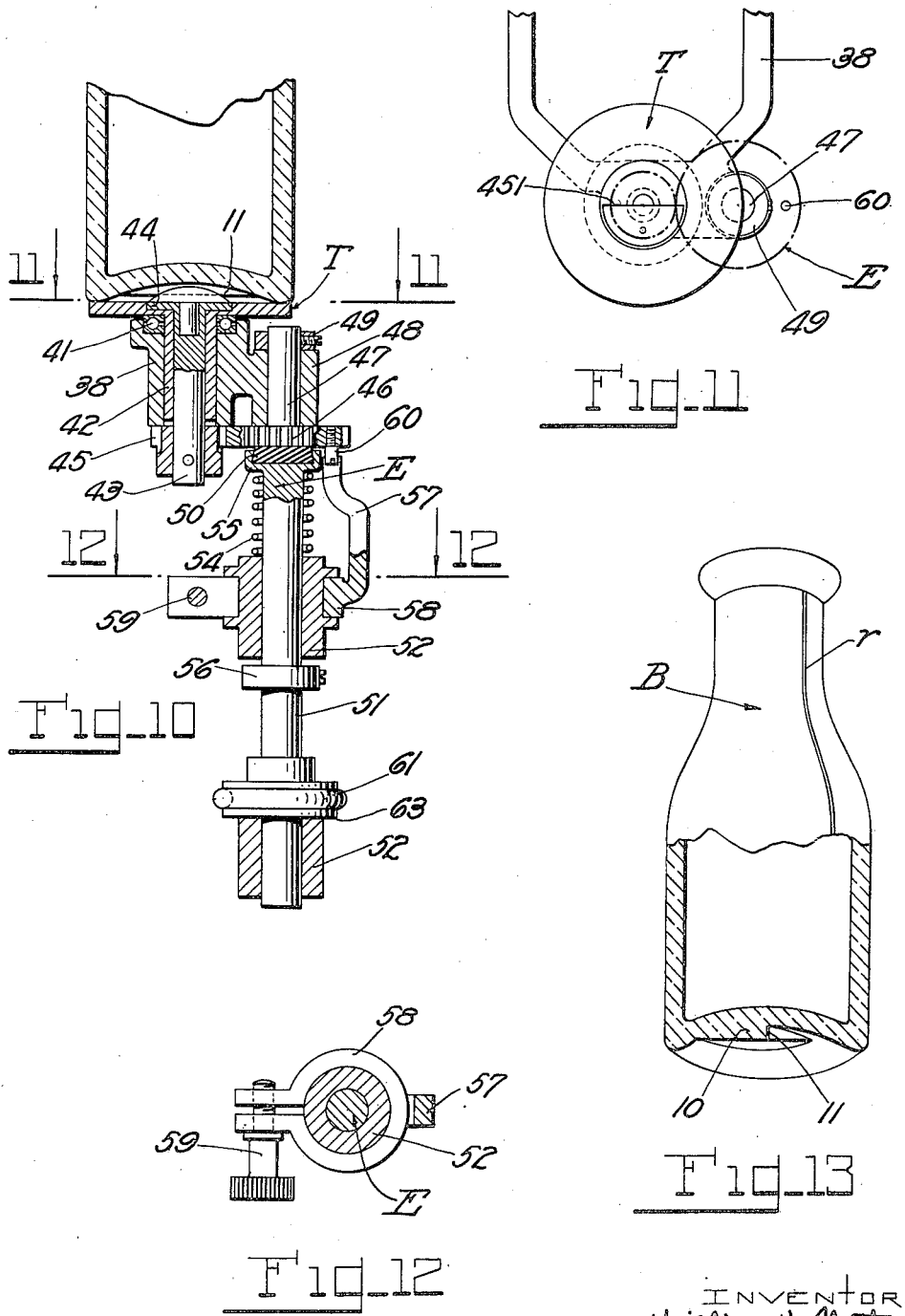

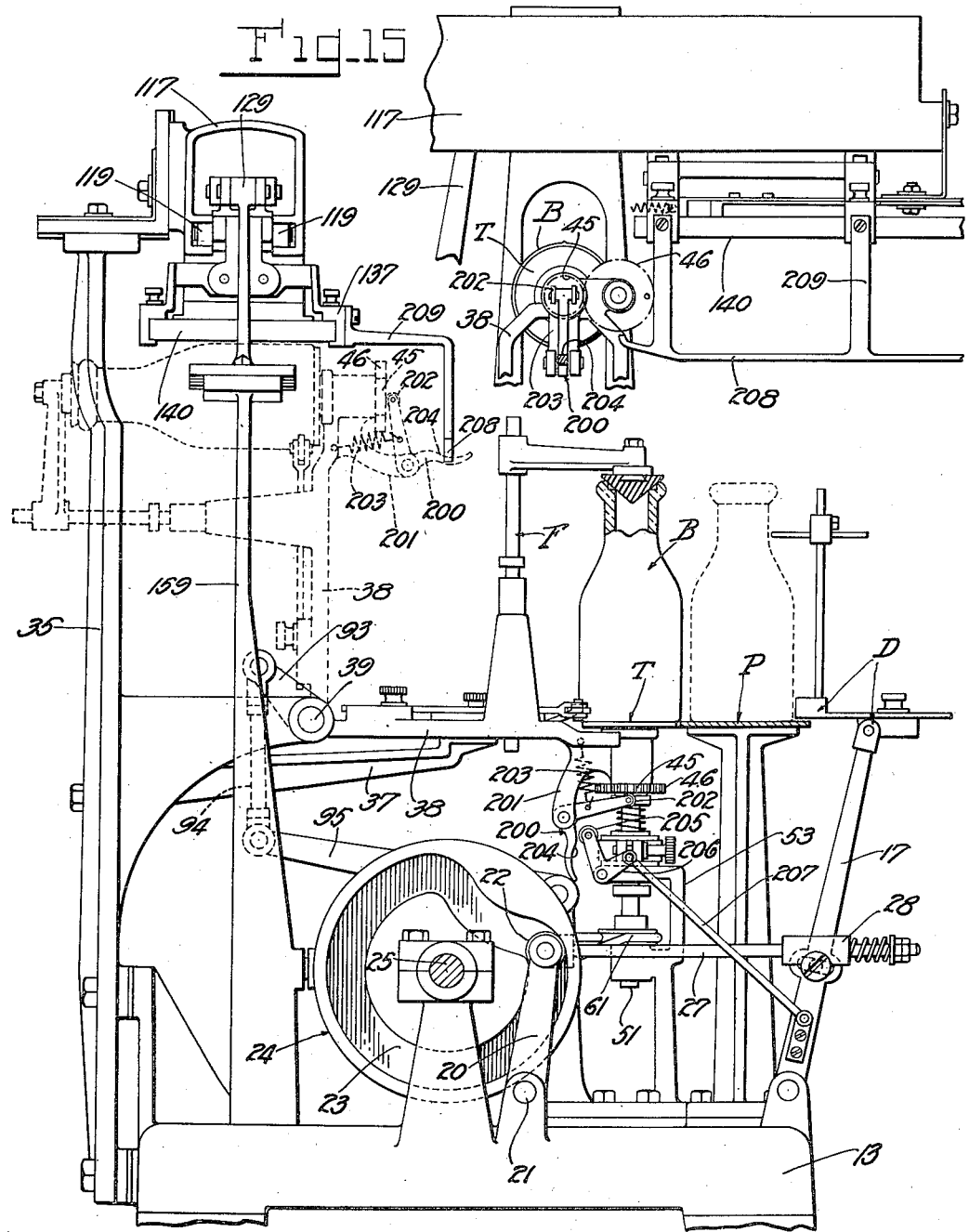

April 1, 1941.  W. H. NUTT  2,237,058
APPARATUS FOR HANDLING AND DECORATING ARTICLES
Filed Feb. 7, 1940  7 Sheets-Sheet 7

Patented Apr. 1, 1941

2,237,058

UNITED STATES PATENT OFFICE 2,237,058

APPARATUS FOR HANDLING AND DECORATING ARTICLES

William H. Nutt, Beverly, Mass.

Application February 7, 1940, Serial No. 317,769

11 Claims. (Cl. 101—124)

This invention relates to the handling of articles while performing manufacturing operations. More particularly the invention relates to handling articles during and for the purpose of applying decorations thereto.

It is an object of the invention to provide a system and apparatus for handling articles in an efficient and speedy manner for the purpose of performing manufacturing operations.

It is another object of the invention to provide a machine for handling articles to assure their proper positioning while performing manufacturing operations, such as the application of decorations thereon.

A further object of the invention is the provision of a machine adapted to be used successively for separately applying different parts of a decoration and arranged to assure the accurate positioning of the different parts of the decoration with relation to one another.

It is a still further object of the invention to provide apparatus for handling articles so that various manufacturing operations may be performed automatically.

These and other objects of the invention will be more clearly understood from the following description in conjunction with the accompanying drawings: in which, Fig. 1 is a diagrammatic view of apparatus for handling articles to be decorated in accordance with the invention;

Fig. 2 is a plan view of a machine embodying the invention for handling bottles to be decorated;

Fig. 3 is a front elevational view of the machine partly in section;

Fig. 4 is a fragmentary sectional front elevational view of a portion of the machine illustrating the parts in different positions;

Fig. 5 is an elevational view of the machine as viewed from the left in Fig. 3;

Fig. 6 is a fragmentary detail elevational view similar to Fig. 5 showing the parts in a different position;

Fig. 7 is an enlarged fragmentary detail view, partly in section, showing a portion of the machine as viewed in Fig. 5.

Fig. 8 is a fragmentary view similar to Fig. 7 but with the parts in different positions;

Fig. 9 is a plan view, partly in section, of a portion of the machine shown in Fig. 7;

Fig. 10 is a sectional view taken on the line 10—10 of Fig. 7;

Figure 16:
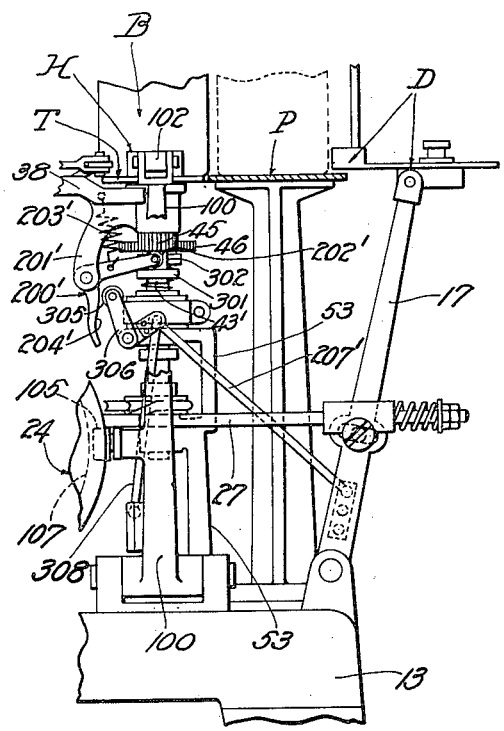
Figure 17:
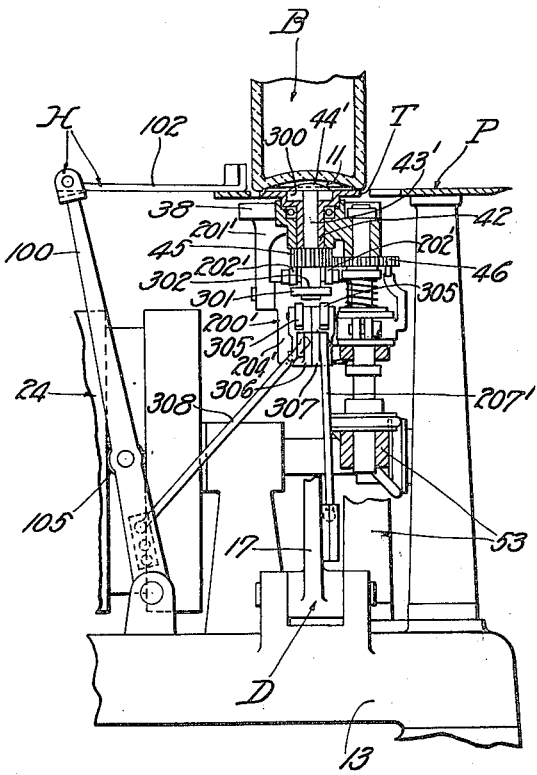

Figs. 11 and 12 are sectional views taken upon the line 11—11 and 12—12, respectively, of Fig. 10;

Fig. 13 is a perspective view of a bottle, partly in section;

Fig. 14 is a view similar to Fig. 5 embodying additional mechanism as a modification;

Fig. 15 is a fragmentary view similar to Fig. 3 embodying the modification shown in Fig. 14;

Fig. 16 is a fragmentary view similar to Figs. 5 and 14 embodying additional mechanism as a modification; and Fig. 17 is a fragmentary view similar to Fig. 3 embodying the modification shown in Fig. 16.

The invention is illustrated in the accompanying drawings as embodied in an apparatus for handling bottles when in process of being decorated, such as milk and soda bottles, with ceramic paint. The paint decoration is supplied to the bottle and the latter then transferred to a drier where it is heated to set and render the decoration dry enough to receive another color application. If the decoration contains more than one color, each color is applied to the bottle and is set or dried before another color is applied.

In accordance with the invention the various operations are performed automatically. Thus, the bottles to be decorated are conveyed successively to a decorating machine where a colored ceramic paint is applied to form the decoration. When the decoration has been applied to the bottle it is conveyed out of the decorating machine into a drier or leer while another bottle is conveyed to the machine as illustrated diagrammatically in Fig. 1. If the desired decoration contains more than one color, each bottle is conveyed out of the drier and successively to another decorating machine, where another color is applied, and then conveyed through another drier and so on depending upon the number of colors in the desired decoration. After all the colors have been applied, the bottle is passed through a leer to render the colors permanent.

Bottles as now manufactured have longitudinally extending seams or lines $r$ upon their outer surface at diametrically opposite positions (Figs. 7, 9 and 13). It is desirable to position the decoration on the smooth portions between these seams. To assure the proper positioning of the bottle in the decorating machine for this purpose, the concave outer surface of the bottom of each bottle is formed with a depending portion 10 (Fig. 13) providing a vertical surface 11 perpendicular to a plane through the opposite seams $r$.

The handling machine illustrated comprises, in general, a conveyor A (Figs. 2, 3 and 5) for conveying bottles B upon a platform P and a conveyor C for discharging decorated bottles from the platform. The bottles are fed successively upon a work table or support T (Figs. 5, 7, 8, 10 and 11) by feeding mechanism D (Figs. 2, 3, and 5). After properly arranging the bottle in a predetermined desired position upon the table T by arranging mechanism E (Figs. 3 and 10), the table T with its associated bottle holding mechanism F is moved to bring the bottle in operative relation to the paint-applying mechanism G as shown in dotted lines in Fig. 5. The work table T then is returned to its position adjacent the platform P and the bottle is ejected by mechanism H (Figs. 2 and 3) and conveyed away from the machine by the conveyor C into a drier or leer.

The platform P is mounted upon the top of a post 12 extending upwardly from the main frame 13 of the machine. The platform is provided with a gate for receiving the bottles from the conveyor A comprising fixed and adjustable guides 14 and 15, respectively, and an adjustable stop 16. The adjustable stop 16 serves to aline successive bottles B between the feeding mechanism D and the work table T.

The feed mechanism D comprises a lever 17 pivotally mounted at one end to the frame 13 and pivotally connected at its other end to a block 18. A plate 19 is adjustably mounted upon the block 18 so as to overlap the edge of the platform P. A lever 20 is fixed upon one end of a rock shaft 21 which is mounted in suitable bearings carried by the frame 13. The free end of the lever 20 carries a cam roll 22 adapted to engage a cam groove 23 in the left end of a cam 24 as viewed in Figs. 2 and 3. The cam 24 is fixed upon the main shaft 25 which is mounted for rotation in suitable bearings carried by the frame 13. A lever 26 is fixed at one end to the shaft 21 and is pivotally connected at its other end to one end of a rod 27 which is connected near its other end by a pivotable and yieldable connection 28 to the lever 17 intermediate the ends of the latter. The end of the plate 19 which overlaps the platform P is provided with a V-shaped recess 30 adapted to engage the surface of a bottle near the bottom thereof. A rod 31 projecting upwardly from the plate 19 adjacent the recess 30 is provided near its upper end with a member 32 adapted to engage the surface of the neck of the bottle.

A post 35 is secured to the frame 13 and projects upwardly from the back thereof and is provided with a pair of spaced forwardly projecting brackets 36. The post 35 also carries a bracket 37 projecting forwardly therefrom at a position between the brackets 36 and slightly below the latter. An arm 38 is fixed at one end to a shaft 39 which extends between and is mounted for rotation in bearings carried by the forward ends of the brackets 36. The arm 38 is provided intermediate its ends with an elongated rectangular shaped opening 40, surrounding the upwardly extending forward end of the bracket 37.

The work table T is rotatably supported upon ball bearings 41 carried by the arm 38 and projecting above its top surface adjacent its forward end. The table T is provided with a depending sleeve 42 mounted for rotation in the arm 38. A shaft 43 is mounted for rotation within the sleeve 42 and extends upwardly through the table T and is provided at its upper end with a detachable head 44 having a vertical surface 451 adapted to engage the surface 11 upon a bottle B. A pinion 45 is secured to the shaft 43 near its lower end and meshes with a pinion 46 on a shaft 47 which is mounted for rotation in a laterally offset portion 48 of the arm 38. The shaft 47 is held against axial movement in the portion 48 of the arm 38 by a collar 49 fixed to the shaft.

The flat surface of the pinion 46 rests upon a friction drive disk 50 fixed in a cup 55 formed in the upper end of a shaft 51 which is mounted for rotation in spaced bearings 52 in a bracket 53 projecting upwardly from the frame 13 (Figs. 5 and 10). A spring 54 surrounds the shaft 51 with one end engaging the top surface of the upper bearing 52 and its other end engaging the shoulder formed by the cup 55. The spring 54 serves to provide a yielding driving connection between the disk 50 and the pinion 46. A collar 56 is secured upon the shaft 51 between the bearings 52 and limits the upward movement of the disk 50 when the latter is not engaging the pinion 46 as described hereinafter. A stop 57 projects upwardly from a clamping ring 58 which is secured to the upper bearing 52 by a clamping screw 59. A stop screw 60 secured to the pinion 46 near its periphery and depending from its lower surface is adapted to engage the stop 57. The shaft 51 is connected with the main shaft 25 by a belt 61 extending between and engaging pulleys 62 and 63 fixed upon the main driving shaft 25 and the shaft 51 respectively.

A plate 66 is slidably mounted in a guideway formed by spaced projections 67 extending upwardly from the bracket 37 into the opening 40 in the arm 38. The plate 66 is provided with a laterally projecting pin 68 adapted to engage the rear vertical surface of one of the projections 67 to limit the forward movement of the plate. The plate is urged forwardly by a spring 69 extending between the pin 68 and a pin 70 projecting from the bracket 37. A plate 71 is adjustably secured upon the plate 66 by a clamping screw 72. An arm 73 is pivotally mounted intermediate its ends between spaced lugs 74 depending from the forward end of the plate 71. The forward end of the arm 73 is adapted to project over the back edge of the work table T and be engaged by a bottle B as the latter is fed into its position upon the table. The rear end of the arm 73 is provided with a weight 75 for a purpose described hereinafter. A botle positioning plate 76 is adjustably secured upon the arm 38 by a clamping screw 77. The forward end of the plate 76 is provided with a pair of forked arms 78 connected by a cross member 79. A roll 80 is mounted on each of the arms 78 and is adapted to be engaged by a bottle upon the table T and limit its rearward position thereon.

A bottle is held upon the table T by the clamping device F which comprises a post 85 slidably mounted in a sleeve 86 forming part of a yoke 87 projecting upwardly from the arm 38 at opposite sides of the opening 40. The post 85 is adapted to rest upon the plate 66 when the latter is in its forward position as shown in Fig. 8. An arm 88 is secured at one end to the post 85 near the upper end of the latter. A plug 89 is rotatably carried at the free end of the arm 88 and is adapted to project into a bottle B and engage the rim thereon. A spring 90 surrounds the post 85 and extends between the sleeve 86 and a collar 91 fixed upon the post. The spring 90 serves to move the post 85 downwardly to the position shown in Fig. 7 to bring the plug 89 into yielding engagement with the bottle B when the plate 66 is in its rearmost position.

The arm 38, together with the work table T and the clamping mechanism F carried thereby, is adapted to be moved from the full line position to the dotted line position shown in Fig. 5 by mechanism including an arm 93, one end of which is fixed to the shaft 39, and an arm 95 one end of which is pivotally mounted upon a bracket 96 projecting upwardly from the frame 13. The free ends of the arms 93 and 95 are pivotally connected to opposite ends of a rod 94. A cam roll 97 mounted upon the arm 95 intermediate its ends is adapted to engage a cam groove 98 in the end of the cam 24 at the right as viewed in Fig. 2.

The bottle ejecting mechanism H comprises an arm 100 which is pivotally mounted at its lower end between spaced lugs 101 projecting upwardly from the frame 13. The other end of the arm 100 is pivotally connected to one end of an arm 102. The other end of the arm 102 slidably engages the top surface of the platform P and is provided with a V-shaped recess 103 adapted to engage the surface of a bottle B. The arm 100 is provided with a rearwardly projecting lug 104 intermediate its ends in which is mounted a cam roll 105 adapted to engage a cam groove 107 formed in the cylindrical surface of the cam 24.

The paint-applying mechanism G is supported upon the post 35. A slide 110 is provided with a tongue 111 adapted to engage slideways in the top of the post 35. A bolt 112 adjustably secures the slide to the post 35. A projection 113 extends upwardly from the forward edge of the slide 110 and is provided with a tongue 114 adapted to engage slideways in a slide 116 integrally secured to the rear portion of an inverted channel member 117. The channel member 117 is secured in desired adjusted position by a bolt 101. Each of the opposite walls of the channel member 117 is provided with spaced inwardly extending ribs 108 and 109 forming a groove 118 therebetween. The paint-applying mechanism G is movably supported in the grooves 118 by rolls 119 carried by spaced mounting members 120 and 121. Each of the mounting members 120 and 121 is of similar construction and comprises a pair of spaced levers 122 connected by a cross member 123. One of the rolls 119 is mounted upon each of the levers 122 intermediate its ends. A pair of spaced ears 124 extend upward from the cross member 123. The opposite ends of a link 125 are pivotally connected between the pairs of ears 124 on the mounting members 120 and 121.

A roll 130 is mounted upon the end of each of the levers 122 at the right as viewed in Figs. 1, 3 and 4 and is adapted to project into one of the grooves 118. One end of a member 131 is positioned between the other ends of the levers 122 of each of the mounting members 120 and 121 and depends therefrom. The other end of each of the members 131 is provided with a groove 132 to receive one of the two cross members 133 of a rectangular frame 134. A pair of spaced rolls 135 carried by each of the members 131 engage inclined elongated slots 136 in the member 133. A bracket 137 depends from each corner of the frame 134 and each is provided with a groove 138 adapted to receive a rectangular paint platen 140 which is held securely in position by set screws 141. The platen 140 comprises a hollow receptacle containing the paint to be applied to the bottle. A screen, such as a piece of silk or other material of a porous nature, is stretched across the bottom of the platen 140. This screen is prepared with the desired design and then treated so that the paint may pass through those portions only forming part of the design. A squeegee 150 is secured to one end of each of a pair of plates 149 which are adjustably secured together and slidably mounted in a bracket 151 secured to the end of the channel member 117 at the right as viewed in Figs. 3 and 4. The upper plate 149 is provided with an upwardly extending projection 152 adapted to engage the bracket 151. A spring 153 tends to maintain the projection 152 in engagement with the bracket 151 and, for this purpose, one end is connected to the upper squeegee plate 149 and its other end is connected to a pin 154 depending from the member 117 near its end at the left as viewed in Fig. 3.

A rod 126 is provided with a yoke 127 at one end which straddles the ears 124 of the mounting member 121 and is pivotally connected thereto. The other end of the rod 126 is provided with a yoke 128 in which one end of a link 129 is pivotally mounted.

The other end of the link 129 is provided with a block 156 having a slideway 157 extending forwardly and rearwardly of the machine. A block 158 formed on the upper end of a lever 159 is provided with a tongue adapted to cooperate with the slideway 157. The blocks 156 and 158 are secured in desired relative position by a bolt 160. A plurality of longitudinally spaced apertures 161 are formed in the lever 159 near its other end. A bracket 162 depending from the frame 13 is provided with a plurality of similarly spaced apertures 163. The lever 159 may be pivotally connected to the frame 13 by a bolt 165 passing through any corresponding pair of apertures 161 and 163. The lever 159 is provided with a forwardly extending lug 166 in which is mounted a cam roll 167 adapted to engage a cam groove 168 formed in the cylindrical surface of the cam 24.

The main shaft 25 may be rotated from any suitable source of power by a belt 170 passing over a pulley 171 fixed upon the shaft 25.

Bottles placed upon the conveyor A are moved thereby through the guides 14 and 15 so that a plurality of bottles are always positioned upon the platform P with one in engagement with the stop 16 and in alinement with the feeding mechanism D and the work table T. As the main shaft 25 is rotated, the feeding mechanism D is actuated to feed a bottle from the dotted-line position upon the platform P to the full-line position upon the work table T, as shown in Fig. 5. When the feed mechanism D has returned to the position shown in Figs. 2 and 5, the conveyor A causes another bottle to be moved in engagement with the stop 16. When a bottle is being fed to the work table T the holding mechanism F is in its inoperative position with the post 85 resting upon the slide 66. As the bottle is moved upon the table T it comes in engagement with the lever 73 and gradually moves the slide 66 to the left as viewed in Figs. 5, 7, 8 and 9. About the time the bottle engages the positioning rolls 80, the slide 66 has been moved to a position out of engagement with the post 85 thereby permitting the spring 90 to move the post 85 downward and bring the plug 89 in engagement with the neck of the bottle under a yielding pressure to hold the bottle upon the table.

When the bottle reaches the work table T, rotation of the shaft 43 brings the surface 45 of the head 44 in engagement with the surface 11 on the bottle. The bottle then rotates with the shaft 43 until the stop screw 60 engages the stop 57 whereupon further rotation of the bottle is prevented. The bottle is now arranged with the seams r in a predetermined desired position for receiving the decoration.

As the rotation of the cam 24 continues, the lever 95 and arm 93 are actuated to turn the arm 38 together with the table T and bottle from the full-line position to the dotted-line position shown in Fig. 5. The seams r on the bottle now lie in a common vertical plane, as shown in dotted-lines in Fig. 3.

As the arm 38 is turned, the slide 66 is moved to its forward position due to the action of the spring 69. At the same time the arm 73 is moved from its full-line position to its dotted-line position shown in Fig. 8, due to the action of the weight 75.

Further rotation of the cam 24 actuates the lever 159 to swing the latter to the left, as viewed in Fig. 3, and cause the links 125 and 126 to move to the left. As this movement begins, the lugs 124 are turned from the position shown in Fig. 3 to the position shown in Fig. 4 thereby moving the rolls 130 from engagement with the ribs 108 into engagement with the ribs 109 and swinging the levers 122 to lower the platen 140. Further movement of the lever 159 to the left causes the platen 140 to move to the left and be brought in engagement with the surface of the bottle. If the surface of the bottle happens to be slightly conical rather than cylindrical, accurate engagement of the platen with the bottle is assured by self-adjustment due to the action of the rolls 135 riding in the slots 136. When the squeegees 150 are positioned as shown in Fig. 4, the stop 152 engages the bracket 151 to maintain the squeegees in such position relative to the axis of the bottle as the platen continues to move to the left. Further movement of the platen to the left causes the bottle to rotate so that the paint is applied to the smooth surface between the seams r.

As the action of the cam 24 causes the lever 159 to begin its movement toward the right as viewed in Fig. 3, the lugs 124 first are turned from the positions shown in Fig. 4 to that shown in Fig. 3, thereby raising the platen. The platen is then moved to the right and returned to its initial position, as viewed in Fig. 3.

Thereafter the cam 24 causes the arm 93 to turn in a clockwise direction, as viewed in Fig. 5, to move the arm 38 together with the bottle and work table T from the dotted-line position to the full-line position shown in Fig. 5, and bring the pinion 46 back in engagement with the friction disk 50. Inasmuch as the slide 66 is now in its forward position, the end of the post 85 engages the slide 66 to move the plug 89 upwardly out of engagement with the neck of the bottle against the action of the spring 90. As the arm 38 approaches its full-line position shown in Fig. 5, the lever 100 is moved from the position shown in Fig. 3 to the right to eject the bottle from the work table T onto the platform P. Another bottle B now is moved by the feeding mechanism D from its position on the plateform P in engagement with the stop 16 onto the work table T and the cycle of operations above described are repeated. As the bottles are ejected from the table T, the previously ejected bottle is moved from the platform P onto the conveyor C and conveyed by the latter into a drier to dry the ceramic paint upon the surface of the bottle.

Under certain circumstances, additional provision may be desirable for assuring against displacement of the bottle after it has been properly positioned upon the work table T, that is, while it is moved to and from the paint applying position. With this in view, a mechanism such as illustrated in Figs. 14 and 15 may be embodied in the paint applying machine. Thus, a bell crank 200 is pivotally mounted upon a projection 201 depending from the arm 38 beneath the table T. A shoe 202 carried by one end of the bell crank 200 normally is held against the face of the pinion 46 by a spring 203 extending between one arm of the bell crank and the arm 38. The other arm of the bell crank 200 is formed with a cam surface 204 adapted to be engaged by a roll 205 mounted upon one end of a lever 206 which is pivotally mounted intermediate its ends upon the bracket 53. One end of a rod 207 is pivotally connected to the other end of the lever 206 and the other end of the rod is pivotally connected to the lever 17 of the feed mechanism D. A cam rail 208 is formed upon a bracket 209 depending from the member 137.

In the embodiment of the invention, illustrated in Figs. 14 and 15, as the feeding mechanism D is moved to feed a bottle from the platform P to the work table T, the movement of the lever 17 in a counter-clockwise direction causes the lever 206 to pivot in a counter-clockwise direction. This movement of the lever 206 causes the bell crank 200 to turn in a clockwise direction against the action of the spring 203 and thus move the shoe 202 out of engagement with the pinion 45. The pinion 45 now is free to be rotated to position the bottle properly upon the table T, as previously described. As the lever 17 is moved in a clockwise direction, as viewed in Fig. 14, the shoe 202 is returned to its holding position in engagement with the pinion 46 and the arm 38 carrying the work table T and bottle is moved from the full line to the dotted line position, shown in Fig. 14. As the platen 140 is moved to the left, as viewed in Fig. 15, and is about to engage the bottle, the cam rail 208 engages the cam surface 204 upon the bell crank 200 to turn the latter in a clockwise direction, as viewed in Fig. 14, and releases the shoe 202 from engagement with the pinion 45, thereby permitting the bottle to rotate in engagement with the platen and receive the paint decoration.

As the platen 140 is moved to the right, as viewed in Fig. 15, back to its inoperative position, the cam rail 208 moves out of engagement with the cam surface 204, thereby permitting the spring 203 to return the shoe 202 to its position in engagement with the face of the pinion 45. Thus, displacement of the bottle is prevented as the arm 38 is moved from the dotted line to the full line position, shown in Fig. 14.

If the desired decoration contains more than one color, a plurality of decorating machines are employed in an arrangement such as is illustrated in Fig. 1. Under such conditions each bottle passes successively through each decorating machine where the different colors are applied thereto. Each bottle is conveyed from each of the decorating machines into a drier and then from the drier to the next decorating machine. Thus, as illustrated in Fig. 1, each bottle is conveyed by the conveyor A on to the platform P of the decorating machine M, and after paint is applied thereby the bottle is discharged therefrom by the conveyor C. The conveyor C conveys the bottle through the drier O, and then on to the platform of the decorating machine M2. The bottle is discharged from the machine M2 by the conveyor C, and is conveyed thereby through the drier O2 and then on to the platform of the decorating machine M3. The conveyor C2 conveys the bottle through the final decorating leer O3.

In the modification illustrated in Figs. 16 and 17 means is provided similar to that shown in Figs. 14 and 15 for assuring against displacement of the bottle after it has been properly positioned upon the work table T. In addition, in the construction shown in Figs. 16 and 17, means is provided for moving the head 44' from its position where it is adapted to engage the surface 11 of the bottle to a lower position with respect to the top surface of the table T so as to remove the head 44' from the path of movement of the bottle as the latter is fed upon the table and ejected therefrom. Thus, the shaft 43' which carries the head 44' is mounted for axial movement in the sleeve 42 to permit the head 44' to be moved from the position shown in Fig. 17 into a recess 300 in the top of the table T. A bell crank 200' is pivotally mounted upon a projection 201' depending from the arm 38 beneath the table T. A collar 301 is fixed upon the shaft 43' below the pinion 45 and in spaced relation with respect to the latter to provide a groove 302 therebetween. Shoes 202' carried by one end of the bell crank 200' normally are held against the face of the pinion 46 in the groove 302 by a spring 203' extending between one arm of the bell crank and the arm 38. The other arm of the bell crank 200' is formed with a cam surface 204'. A pair of bell cranks 306 and 307 are pivotally mounted intermediate their ends upon the bracket 53. A roll 305 is mounted upon one end of each of the bell cranks 306 and 307 and is adapted to engage the cam surface 204'. One end of a rod 207' is pivotally connected to the other end of the bell crank 307 and its other end is connected by a ball and socket connection to the lever 17 of the feed mechanism D. One end of a rod 308 is connected by a ball and socket connection to the other end of the bell crank 306 and the other end of the rod 308 is connected by a ball and socket connection to the lever 100 of the ejecting mechanism H.

As the feed mechanism D is actuated to move a bottle from the dotted-line position on the platform P to the full-line position upon the table T as shown in Fig. 16, the bell crank 307 is rotated to bring the roll 305 carried thereby into engagement with the cam surface 204' to turn the bell crank 200' and cause the shaft 43' to be moved axially to bring the head 44' out of the path of movement of the bottle B. As the feed mechanism is returned to its original position, the shaft 43' is moved axially to return the head 44' to its position as shown in Fig. 17 so that it may cooperate with the surface 11 on the bottle to position the latter as predetermined upon the table T.

As the lever 100 of the ejecting mechanism H is moved toward the right as viewed in Fig. 17, the rod 308 is moved to turn the bell crank 306 to bring the roll 305 carried thereby into engagement with the cam surface 204' and turn the bell crank 200'. This causes the shaft 43' to be moved axially to move the head 44' out of the path of movement of the bottle as it is ejected from the table T onto the platform P. As the ejecting mechanism is returned to its initial position as illustrated in Fig. 17, the shaft 43' is moved axially to return the head 44' to the position shown in Fig. 17.

I claim:

1. In an apparatus for handling articles, a support for the article movable between a receiving and a decorating station, means for moving an article onto said support from a position adjacent said receiving station, means rendered operative by so moving said article for holding the articles on said support, means operative at said receiving station for arranging the article in a predetermined position on said support, and means for moving said support between said stations.

2. In an apparatus for handling articles, a support for the article movable between a receiving and a decorating station, means for moving an article onto said support from a position adjacent said receiving station, means rendered operative by so moving said article for holding the article on said support, means operative at said receiving station for arranging the article in a predetermined position on said support, and means for moving said support between said stations, and means operative as said support approaches said receiving station for releasing said holding means.

3. In an apparatus for handling articles, a support for the article movable between a receiving and a decorating station, means for moving an article onto said support from a position adjacent said receiving station, means rendered operative by so moving said article for holding the article on said support, means operative at said receiving station for arranging the article in a predetermined position on said support, means for moving said support between said stations, means operative as said support approaches said receiving station for releasing said holding means, and means for conveying an article away from said receiving station.

4. In an apparatus for handling articles, a frame, a support for the article movable on said frame between a receiving and a decorating station, yieldable means associated with said support for holding an article on said support, means for conveying an article on to said support, a slide movable on said frame independent of said support from a position to maintain said holding means out of engagement with said article to a position to release said holding means, means operable as an article is conveyed onto said support to move said slide in a direction to release said holding means, and means tending to move said slide in the opposite direction.

5. In an apparatus for handling articles, a frame, a support for the article movable on said frame between a receiving and a decorating station, yieldable means associated with said support for holding an article on said support, means for conveying an article on to said support, a slide movable on said frame independent of said support from a position to maintain said holding means out of engagement with said article to a position to release said holding means, means operable as an article is conveyed onto said support to move said slide in a direction to release said holding means, means tending to move said slide in the opposite direction, means carried by said support adapted to be rotated for arranging an article thereon in a predetermined position, and means carried by said frame for rotating said arranging means to a predetermined position when said support is in said receiving position.

6. In an apparatus for handling articles, a support for the article to be decorated, means for feeding an article upon said support, means for ejecting an article from said support, means for arranging an article on said support in a predetermined position, and means adapted to be actuated by said feeding and ejecting means for moving said arranging means first out of its operative position and then into its operative position.

7. In an apparatus for handling bottles, separate spaced endless feed and discharge conveyors having smooth uninterrupted bottle supporting surfaces arranged to move in laterally spaced paths in a horizontal plane to carry bottles in an upright position, a work support adapted to be positioned between said conveyors in said plane to receive a bottle in an upright position from said feed conveyor and permit its discharge on to said discharge conveyor, a stationary stop associated with said feed conveyor for positioning bottles successively opposite said support, means for feeding a bottle so positioned on to said support, means for moving said support from its work receiving position to another position and return, means for discharging a bottle from said support on to said discharge conveyor, and mechanism for actuating each of said means successively in the order mentioned.

8. In an apparatus for handling bottles, separate spaced endless feed and discharge conveyors having smooth uninterrupted bottle supporting surfaces arranged to move in laterally spaced paths in a horizontal plane to carry bottles in an upright position, a work support adapted to be positioned between said conveyors in said plane to receive a bottle in an upright position from said feed conveyor and permit its discharge on to said discharge conveyor, a stationary stop associated with said feed conveyor for positioning bottles successively opposite said support, means for feeding a bottle so positioned on to said support, means for moving said support from its work receiving position to another position and return, means for discharging a bottle from said support on to said discharge conveyor, and mechanism for actuating each of said means successively in the order mentioned, and an oven arranged to permit the passage therethrough of said discharge conveyor.

9. In an apparatus for handling bottles, separate spaced endless feed and discharge conveyors having smooth uninterrupted bottle supporting surfaces arranged to move in a horizontal plane to carry bottles in an upright position, a work support adapted to be positioned between said conveyors in said plane to receive a bottle in an upright position from said feed conveyor and permit its discharge on to said discharge conveyor, means for feeding a bottle on to said support, means for moving said support from its work receiving position to another position and return, means for discharging a bottle from said support on to said discharge conveyor, mechanism for actuating each of said means successively in the order mentioned, and means associated with said feed conveyor for stopping movement of successive bottles carried thereby in a position to be moved by said feeding means.

10. In an apparatus for handling bottles, separate spaced endless feed and discharge conveyors having smooth uninterrupted bottle supporting surfaces arranged to move in a horizontal plane to carry bottles in an upright position, a work support adapted to be positioned between said conveyors in said plane to receive a bottle in an upright position from said feed conveyor and permit its discharge on to said discharge conveyor, means for feeding a bottle on to said support, a decorating device movable in a second horizontal plane, means for moving said support from its work receiving position to a second position in which the bottle thereon is supported horizontal and may be engaged by said device and then return the support to its work receiving position, means for discharging a bottle from said support on to said discharge conveyor, mechanism for actuating each of said means successively in the order mentioned, means associated with said feed conveyor for stopping movement of successive bottles carried thereby in a position to be moved by said feeding means, and means actuated by said mechanism for moving said device in said second plane while said support is in said second position.

11. In an apparatus for handling articles, means for rotatably supporting an article, a guide positioned adjacent said supporting means and extending transversely of the axis of an article supported thereby, a rocker mechanism mounted for movement along said guide and for limited rocking movement relative thereto, a decorating device supported by said rocker mechanism, and means for moving said rocker mechanism along said guide first in one direction and then in the opposite direction to cause said device to engage the article while moving transversely thereof and then move transversely of the article in the opposite direction while out of engagement therewith.

WILLIAM H. NUTT.